United States Patent
Chong

(10) Patent No.: US 9,608,845 B2
(45) Date of Patent: Mar. 28, 2017

(54) TRANSMIT APPARATUS AND METHOD

(71) Applicant: Huawei Technologies, Co., Ltd., Shenzhen (CN)

(72) Inventor: Euhan Chong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 47 days.

(21) Appl. No.: 14/634,179

(22) Filed: Feb. 27, 2015

(65) Prior Publication Data
US 2016/0254932 A1  Sep. 1, 2016

(51) Int. Cl.
H04L 25/03 (2006.01)
H04L 27/01 (2006.01)
H04L 25/02 (2006.01)

(52) U.S. Cl.
CPC .... *H04L 25/03019* (2013.01); *H04L 25/0288* (2013.01); *H04L 25/03343* (2013.01); *H04L 27/01* (2013.01)

(58) Field of Classification Search
CPC ... H03F 1/02; H03F 3/45; H03F 3/191; H03F 3/193; H03F 3/45179; H03H 7/30; H03H 7/38; H03K 3/00; H03K 3/01; H03K 5/12; H03K 5/159; H03K 17/16; H03L 5/00; H03L 7/00; H04L 1/00; H04L 25/03; H04L 25/03006; H04L 25/03019; H04L 25/03057; H04L 25/03885; H04L 25/49; H04L 27/01
USPC .... 326/30, 87; 327/108, 141, 155, 170, 307, 327/559, 563; 375/229, 230, 232, 233, 375/348
See application file for complete search history.

(56) References Cited

U.S. PATENT DOCUMENTS

| | | | |
|---|---|---|---|
| 6,281,936 B1 | 8/2001 | Twitchell et al. | |
| 6,870,404 B1 * | 3/2005 | Maangat | H04L 25/03878 327/111 |
| 8,228,976 B2 * | 7/2012 | Hsiao | H04L 25/03133 375/229 |
| 8,810,319 B1 * | 8/2014 | Chan | H03F 1/42 330/253 |
| 8,872,541 B2 * | 10/2014 | Mandal | H04L 25/0288 326/30 |
| 9,049,068 B1 * | 6/2015 | Cyrusian | H04L 25/0272 |
| 9,148,087 B1 * | 9/2015 | Tajalli | H03F 1/0205 |
| 9,281,974 B1 * | 3/2016 | Liu | H04L 25/03 |

(Continued)

FOREIGN PATENT DOCUMENTS

| | | |
|---|---|---|
| CN | 1355955 A | 6/2002 |
| CN | 103220244 A | 7/2013 |
| WO | 2004025917 A1 | 3/2004 |

OTHER PUBLICATIONS

Chaudhuri, S., et al., "Jitter Amplification Characterization of Passive Clock Channels at 6.4 and 9.6 Gb/s", IEEE Electrical Performance of Electronic Packaging, 2006, pp. 35-38.

*Primary Examiner* — Shawkat M Ali
(74) *Attorney, Agent, or Firm* — Slater Matsil, LLP

(57) ABSTRACT

A system comprises a transmitter coupled to a receiver through a plurality of transmission lines, wherein the transmitter comprises a continuous time linear equalizer and a voltage mode driver. The continuous time linear equalizer comprises a differential input stage, a RC degeneration network coupled to the differential input stage and a current source coupled to the differential input stage. The continuous time linear equalizer and the voltage mode driver share a same input port and a same output port.

20 Claims, 7 Drawing Sheets

(56) References Cited

U.S. PATENT DOCUMENTS

| | | | | |
|---|---|---|---|---|
| 9,397,623 | B1* | 7/2016 | Lacroix | H03F 3/193 |
| 2009/0167402 | A1* | 7/2009 | Tian | H03F 3/45197 |
| | | | | 327/307 |
| 2009/0316772 | A1* | 12/2009 | Hidaka | H04L 25/03057 |
| | | | | 375/233 |
| 2012/0049946 | A1* | 3/2012 | Boecker | H03F 1/301 |
| | | | | 327/559 |
| 2013/0114663 | A1* | 5/2013 | Ding | H04L 25/03038 |
| | | | | 375/230 |
| 2013/0154704 | A1 | 6/2013 | Kim et al. | |
| 2014/0092951 | A1* | 4/2014 | Bhagavathula | H04L 7/0066 |
| | | | | 375/229 |
| 2014/0152357 | A1* | 6/2014 | Zerbe | H03K 5/1252 |
| | | | | 327/155 |
| 2014/0167821 | A1* | 6/2014 | Yang | H03F 3/45197 |
| | | | | 327/108 |
| 2014/0185661 | A1* | 7/2014 | Chang | H04L 27/01 |
| | | | | 375/232 |
| 2015/0055431 | A1 | 2/2015 | Lin | |
| 2016/0173299 | A1* | 6/2016 | Islam | H04L 25/03057 |
| | | | | 375/233 |

\* cited by examiner

Dashed Line of Figure 6 Represents Transient Response of a Conventional Voltage Mode Driver

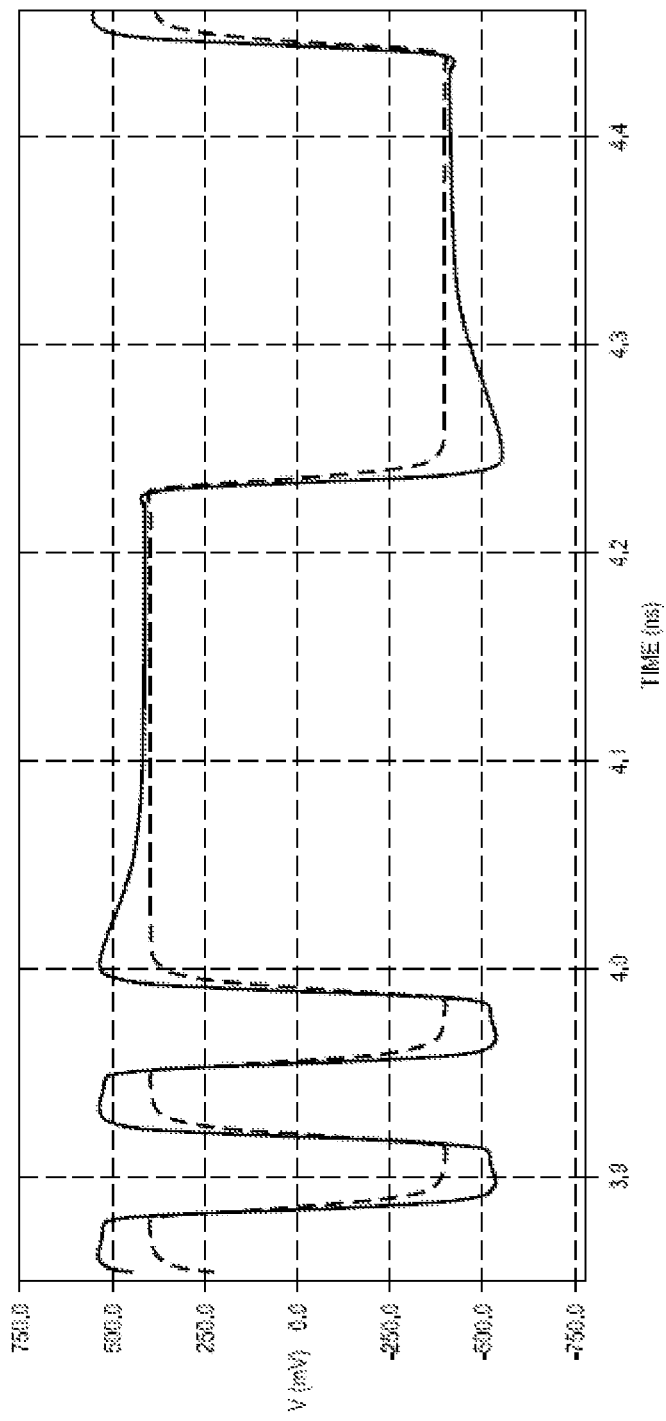

US 9,608,845 B2

1
TRANSMIT APPARATUS AND METHOD

TECHNICAL FIELD

The present invention relates to a transmitter, and, in particular embodiments, to a transmitter apparatus including a continuous time linear equalizer and a voltage mode transmitter.

BACKGROUND

As communication technologies advance, serial interfaces have been widely employed in communication protocols such as Ethernet and PCI Express. For example, serial interfaces have been widely used to convert signals between parallel bus-connected devices and high-speed serial communication systems. In order to enable the movement of a large amount of data between parallel and serial systems, a serializer/deserializer is employed to convert data from a parallel data form to a serial data form in the high-speed serial communication systems.

The serial communication system in its simplest form may comprise input data streams, a transmitter, a communication channel, a receiver and output data streams. The transmitter may receive a parallel set of bits and convert them into serial signals through suitable digital circuits such as multiplexers and shift registers. The serial signals are transmitted over the communication channel to the receiver.

The data streams flowing through the communication channel may be severely distorted when the data streams are transferred at high data rates. For example, the data streams may be distorted by high-frequency losses in the communication channel. In order to reduce distortion and reconstruct clean signals, suitable signal reconstruction techniques such as signal equalization may be employed to equalize the frequency response so as to reduce the high frequency distortion.

In a serial communication system, as data rates increase, jitter has become a much more significant problem. Jitter may cause data distortion at the transmitter, in the communication channel and at the receiver. In order to further improve the system performance, it is necessary to employ a jitter attenuation apparatus to reduce the data distortion of the serial communication system.

SUMMARY OF THE INVENTION

In accordance with an embodiment, a transmitter driver comprises a first voltage mode driver having an input connected to a first data input port, a second voltage mode driver having an input connected to a second data input port and a continuous time linear equalizer having a first input connected to the first data input port, a second input connected to the second data input port, a first output port connected to an output port of the first voltage mode driver and a second output port connected to an output port of the second voltage mode driver, wherein the continuous time linear equalizer comprises a first differential input stage, a first RC degeneration network coupled to the first differential input stage and a current source coupled to the first differential input stage.

In accordance with another embodiment, a system comprises a transmitter coupled to a receiver through a plurality of transmission lines, wherein the transmitter comprises a continuous time linear equalizer and a first voltage mode driver, wherein the continuous time linear equalizer and the first voltage mode driver share a same input port and a same output port, and wherein the continuous time linear equalizer comprises a differential input stage, a RC degeneration network coupled to the differential input stage and a current source coupled to the differential input stage.

In accordance with yet another embodiment, a transmitter comprises a first voltage mode driver having an input connected to a first data input port, a second voltage mode driver having an input connected to a second data input port and a continuous time linear equalizer having a first input connected to the first data input port, a second input connected to the second data input port, a first output port connected to an output port of the first voltage mode driver and a second output port connected to an output port of the second voltage mode driver, wherein the continuous time linear equalizer comprises a first differential input stage, a first RC degeneration network coupled to the first differential input stage, wherein the first RC degeneration network comprises a first adjustable resistor and a first adjustable capacitor connected in parallel and a first current source coupled to the first differential input stage.

An advantage of the present invention is the performance of a transmitter may be improved by connecting a voltage mode transmitter in parallel with a continuous time linear equalizer. More particularly, the efficiency of the transmitter can be improved by employing a voltage mode transmitter and the jitter amplification effect of the transmitter may be reduced by using the continuous time linear equalizer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates a timing diagram showing signals associated with the embodiment shown in FIG. 2;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the present embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely a transmitter driver of a high speed (e.g., 28 Gb/s) serial link system. The invention may also be applied, however, to a variety of different applications such as memories and analog-to-digital converters (ADC). Hereinafter, various embodiments will be explained in detail with reference to the accompanying drawings.

Figure 1:
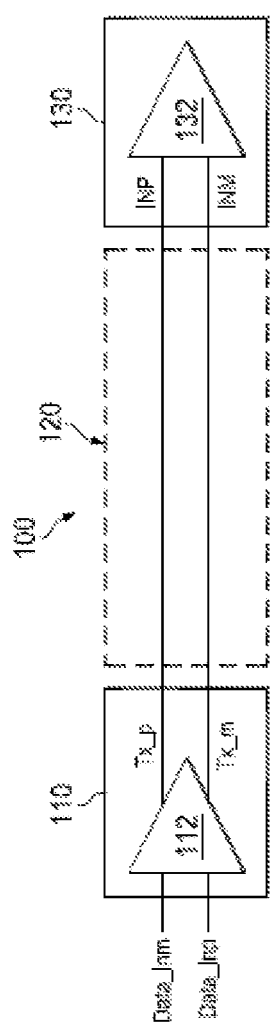
FIG. 1 illustrates a block diagram of a high speed serial link system in accordance with various embodiments of the present disclosure.

FIG. 1 illustrates a block diagram of a high speed serial link system in accordance with various embodiments of the present disclosure. The high speed serial link system 100 comprises a transmitter 110, a differential pair of lines 120 and a receiver 130. As shown in FIG. 1, the transmitter 110, the differential pair of lines 120 and the receiver 130 are connected in cascade.

The transmitter 110 comprises a transmitter driver 112 as shown in FIG. 1. In some embodiments, the transmitter driver 112 may be implemented as a voltage mode driver and a current mode driver connected in parallel. It should be noted that the transmitter 110 is capable of performing a variety of functions such as data serialization and PLL. In the present disclosure, only the transmitter driver 112 is included in the transmitter 110.

The transmitter 110 receives a plurality of data streams (e.g., data streams at input ports Data_inm and Data_inp) and generates a first differential signal at a first output port Tx_p and a second differential signal at a second output port Tx_m. The transmitter 110 sends both differential signals to the receiver 130. The receiver 130 may be far away from the transmitter 110 in the high speed serial link system 100. In order to reduce the level of noise in signals received by the receiver 130, the differential pair of lines 120 may be employed to carry the first differential signal and the second differential signal as shown in FIG. 1.

In some embodiments, the transmitter driver 112 comprises a continuous time linear equalizer and at least one voltage mode transmitter (not shown but illustrated in FIGS. 3-5) connected in parallel between the input signal ports (e.g., Data_inm and Data_inp) and the output ports (e.g., Tx_p and Tx_m) of the transmitter driver 112. The detailed structure and operation principles of the transmitter driver 112 will be described below with respect to FIGS. 2-8.

One advantageous feature of having a continuous time linear equalizer connected in parallel with at least one voltage mode transmitter is the continuous time linear equalizer may reduce the jitter amplification effect of the transmitter and provide a wide signal swing range. In some embodiments, the channel coupled between the transmitter 110 and the receiver 130 may be a band-limited channel. The band-limited channel may generate the jitter amplification effect, which may distort the pulses transferred over the channel. The continuous time linear equalizer may increase the gain of the transmitter driver 112 at a high frequency such as the Nyquist frequency of the transmitter driver 112. Such an increased gain at the Nyquist frequency helps to reduce the jitter amplification effect so as to reduce bit error rates in the high speed serial link system 100.

Another advantageous feature of having the continuous time linear equalizer connected in parallel with the voltage mode transmitter is the voltage mode transmitter enables an efficient data transmission mechanism.

In some embodiments, the differential pair of lines 120 may comprise two complementary transmission lines that transfer opposite signals. In a layout, the differential pair of lines 120 may be implemented as a pair of tightly coupled layout traces. One trace may carry the first differential signal from the output port Tx_p. The other may carry the second differential signal from the output port Tx_m as shown in FIG. 1. In summary, the differential pair of lines 120 may function as two transmission lines for carrying the differential signals.

The receiver 130 comprises an input buffer 132. The input buffer 132 receives a first input signal INP and a second input signal INM. Signals INP and INM are coupled to the first output port Tx_p and the second output port Tx_m respectively.

The input buffer 132 may be implemented as an inverter or a plurality of inverters. It should be noted that the receiver 130 may comprise other suitable features such as data deserialization, clock recovery and clock synchronization. In the present disclosure, only the input buffer 132 is included in the receiver 130 as shown in FIG. 1.

Figure 2:
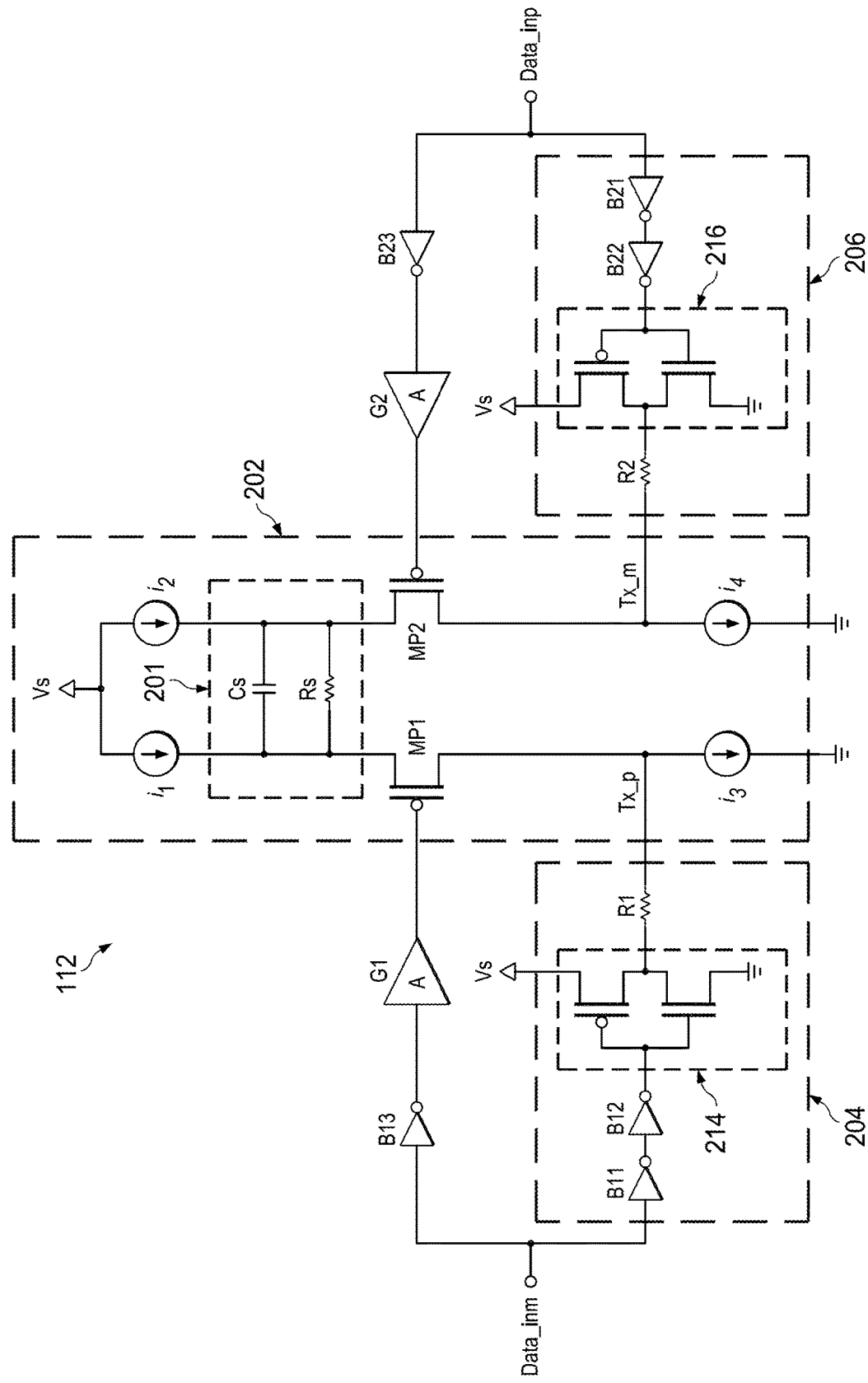
FIG. 2 illustrates a schematic diagram of a first implementation of the transmitter shown in FIG. 1 in accordance with various embodiments of the present disclosure.

FIG. 2 illustrates a schematic diagram of a first implementation of the transmitter shown in FIG. 1 in accordance with various embodiments of the present disclosure. In some embodiments, the transmitter driver 112 comprises a continuous time linear equalizer 202, a first voltage mode transmitter 204 and a second voltage mode transmitter 206. The continuous time linear equalizer 202, and the voltage mode transmitters 204 and 206 are connected in parallel. In other words, the data signals at signal ports Data_inp and Data_inm are processed through two routes. A first route includes the continuous time linear equalizer 202. The second route includes the first voltage mode transmitter 204 and the second voltage mode transmitter 206. Throughout the description, the first voltage mode transmitter 204 may be alternatively referred to as a first voltage mode driver 204. Likewise, the second voltage mode transmitter 206 may be alternatively referred to as a second voltage mode driver 206.

The first voltage mode transmitter 204 comprises two buffers B11-B12 and a first inverter 214. The buffers B11, B12, the first inverter 214 and a first resistor R1 are connected in cascade between a first input signal port Data_inm and a first output signal port Tx_p as shown in FIG. 2. The first inverter 214 comprises a p-type transistor and an n-type transistor connected in series between a fixed voltage potential Vs and ground. The gates of the p-type transistor and the n-type transistor are connected together and further connected to the output of the buffer B12 as shown in FIG. 2. The drains of the p-type transistor and the n-type transistor are connected together and further coupled to the first output signal port Tx_p through the first resistor R1. The first inverter 214 functions a voltage mode output driver. As a voltage mode driver, a series termination resistor is required to terminate the output of the first inverter 214 so as to avoid reflection.

The first resistor R1 functions as a termination resistor. In some embodiments, the first resistor R1 is a 50 ohm resistor. The first resistor R1 helps the output impedance of the first voltage mode transmitter 204 match the characteristic impedance of the transmission line coupled to the first voltage mode transmitter 204.

The second voltage mode transmitter 206 comprises two buffers B21, B22 and a second inverter 216. The buffers B21, B22, the second inverter 216 and a second resistor R2 are connected in cascade between a second input signal port Data_inp and a second output signal port Tx_m as shown in FIG. 2. The structure and operation principle of the second voltage mode transmitter 206 are similar to those of the first voltage mode transmitter 204, and hence are not discussed in further detail herein.

The continuous time linear equalizer 202 comprises a transistor differential pair, a RC degeneration network 201 and a plurality of current sources $i_1$, $i_2$, $i_3$ and $i_4$. In some embodiments, current sources $i_1$, $i_2$, $i_3$ and $i_4$ function as bias current sources. The gain of the continuous time linear equalizer 202 may be adjusted by varying the currents flowing through the continuous time linear equalizer 202 (e.g., $i_1$, $i_2$, $i_3$ and $i_4$). It should be noted that the termination of the continuous time linear equalizer 202 is implemented through the termination resistors (e.g., R1 and R2) of the voltage mode transmitters.

In an embodiment, current sources $i_1$ and $i_2$ charge the outputs Tx_p and Tx_m. As a result, the output voltages at Tx_p and Tx_m increase. In order to have constant common mode voltages at the outputs of the transmitter driver 112, current sources $i_3$ and $i_4$ are employed to shift down the node voltages at Tx_p and Tx_m so as to maintain constant common mode voltages at the outputs of the transmitter driver 112.

The transistor differential pair is formed by two p-type transistors MP1 and MP2. As shown in FIG. 2, the drains of p-type transistors MP1 and MP2 are connected to the first output signal port Tx_p and the second output signal port Tx_m respectively. The drains of MP1 and MP2 are further connected to ground through current sources $i_3$ and $i_4$ respectively. The gate of the p-type transistor MP1 is connected to the first input signal port Data_inm through a buffer B13 and a first gain stage G1. Likewise, the gate of the p-type transistor MP2 is connected to the second input signal port Data_inp through a buffer B23 and a second gain stage G2. Both the buffers (e.g., buffer B13) and the gain stages (e.g., gain stage G1) are well known, and hence are not discussed in further detail herein.

The sources of p-type transistors MP1 and MP2 are connected to the fixed voltage potential Vs through current sources $i_1$ and $i_2$ respectively. In some embodiments, Vs is in a range from 0.9 V to 1.0 V. In alternative embodiments, depending on different applications and design needs, Vs may be a lower voltage such as 0.8 V and 0.6 V. Furthermore, Vs may be a voltage higher than 1.0 V.

The RC degeneration network 201 is connected between the source of MP1 and the source of MP2. As shown in FIG. 2, the RC degeneration network 201 comprises a capacitor Cs and a resistor Rs. In some embodiments, the capacitor Cs and the resistor Rs are connected in parallel as shown in FIG. 2.

It should be noted that one capacitor and one resistor connected in parallel shown in FIG. 2 are merely one example and are not intended to limit the various embodiments of the present invention to any specific number of capacitors and/or resistors. One of ordinary skill in the art would recognize many variations, alternatives, and modifications. For example, the capacitor Cs may be replaced by a plurality of capacitors connected in parallel and/or in series.

The RC degeneration network 201 is employed to provide frequency peaking with a suitable gain at a high frequency such as the Nyquist frequency of the transmitter driver 112. In some embodiments, the resistor Rs is employed to provide a suitable dc gain in a frequency transfer function, which represents the frequency response of the transmitter driver 112. The capacitor Cs is employed to introduce a zero in the frequency transfer function. More particularly, the zero frequency formed by Cs helps to boost the gain of the frequency response at a predetermined frequency (e.g., the Nyquist frequency). The amount of the gain increase can be adjusted by varying the values of Cs and Rs.

In some embodiments, the RC degeneration network 201 and the transistor differential pair may form at least two poles and one zero. The poles and zero may be expressed by the following equations:

$$W_Z = \frac{1}{Rs \cdot Cs} \tag{1}$$

$$W_{P1} = \frac{1 + g_m \cdot Rs/2}{Rs \cdot Cs} \tag{2}$$

where $g_m$ is the trans-conductance of the transistor differential pair.

$$W_{P2} = \frac{1}{R_L \cdot C_L} \tag{3}$$

where $R_L$ and $C_L$ are the output resistance and capacitance respectively. The frequencies of the zero and poles can be used to adjust the high frequency gain of the transmitter driver 112. In some embodiments, $R_L$ is equal to 50 Ohms. It should be noted that the values of $R_S$ and $C_S$ may be programmable. More particularly, the RC degeneration network 201 may comprise a plurality of capacitors and resistors connected in parallel and/or in series. The zero frequency $W_Z$ may be digitally controlled by switching in and out some capacitors and resistors of the RC degeneration network 201.

One advantageous feature of having the transmitter driver 112 shown in FIG. 2 is the combination of a current mode driver (e.g., continuous time linear equalizer 202) and a voltage mode driver (e.g., voltage mode transmitters 204 and 206) helps to reduce power consumption. The total power consumed by the transmitter driver 112 may be not more than the power consumed by a conventional voltage mode driver operating at a larger swing to achieve the same level of boost as the transmitter driver 112 does. In addition, the current mode driver helps to reduce the jitter amplification effect. Such a reduced jitter amplification effect helps to relax the specification requirements on the receiver side (e.g., receiver 130 shown in FIG. 1).

Figure 3:
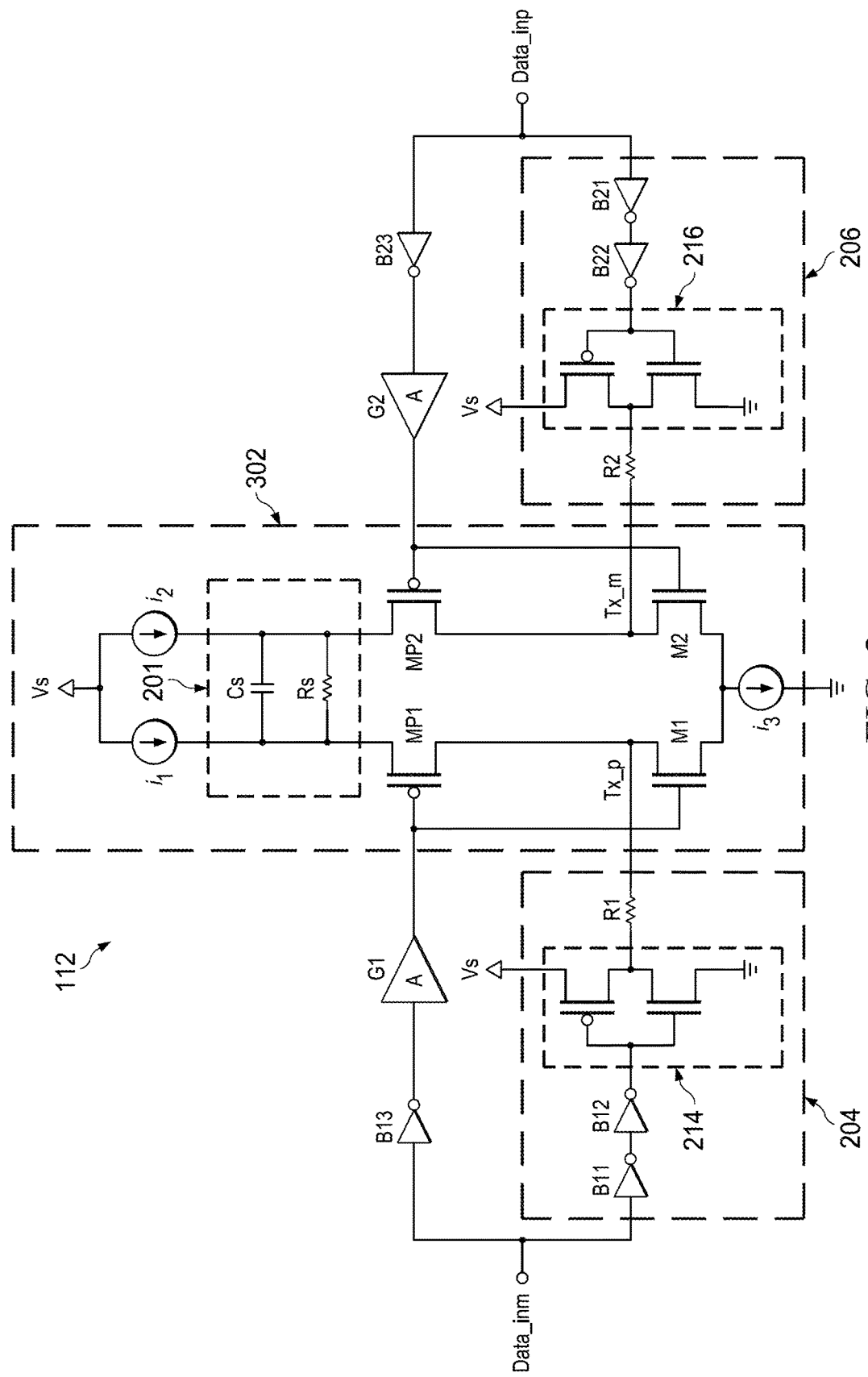
FIG. 3 illustrates a schematic diagram of a second implementation of the transmitter shown in FIG. 1 in accordance with various embodiments of the present disclosure.

FIG. 3 illustrates a schematic diagram of a second implementation of the transmitter shown in FIG. 1 in accordance with various embodiments of the present disclosure. The structure of the transmitter driver 112 shown in FIG. 3 is similar to that shown in FIG. 2 except that an NMOS current mode logic stage 304 has been added into the continuous time linear equalizer 302. As shown in FIG. 3, the continuous time linear equalizer 302 comprises a PMOS current mode logic stage formed by MP1 and MP2, and the NMOS current mode logic stage formed by n-type transistors M1 and M2. As shown in FIG. 3, the NMOS current mode logic stage is connected in parallel with the PMOS current mode logic stage. The sources of the n-type transistors M1 and M2 are connected together and further coupled to ground through a current source $i_3$. In comparison with the continuous time linear equalizer 202 shown in FIG. 2, the additional NMOS current mode logic stage 304 is used to further increase the signal swing range of the continuous time linear equalizer 302.

The trans-conductance of the PMOS current mode logic stage formed by p-type transistors MP1 and MP2 is defined as $g_{mp}$. $g_{mp}$ represents the gain of the PMOS current mode logic stage. The trans-conductance of the NMOS current mode logic stage formed by the n-type transistors M1 and M2 is defined as $g_{mn}$. By connecting the NMOS current mode logic stage and the PMOS current mode logic stage in parallel, the total gain of the continuous time linear equalizer 302 is approximately equal to the sum of $g_{mp}$ and $g_{mn}$. Such an increase in gain helps the continuous time linear equalizer 302 achieve a wide signal swing range.

One advantageous feature of having the continuous time linear equalizer 302 shown in FIG. 3 is the additional NMOS current mode logic stage increases the gain of the continuous time linear equalizer 302. The NMOS current mode logic stage provides a broadband gain. The PMOS current mode logic stage provides a gain boost due to the zero generated by the RC degeneration network. It should be noted that the gain boost is related to the gain increase at a particular high frequency or a high frequency band. The gain boost can be quantified as the difference between the max high frequency gain and the dc gain of the transmitter driver 112. As a result of employing the NMOS current mode logic stage shown in FIG. 3, the continuous time linear equalizer 302 is capable of providing a wider signal swing range.

Figure 4:
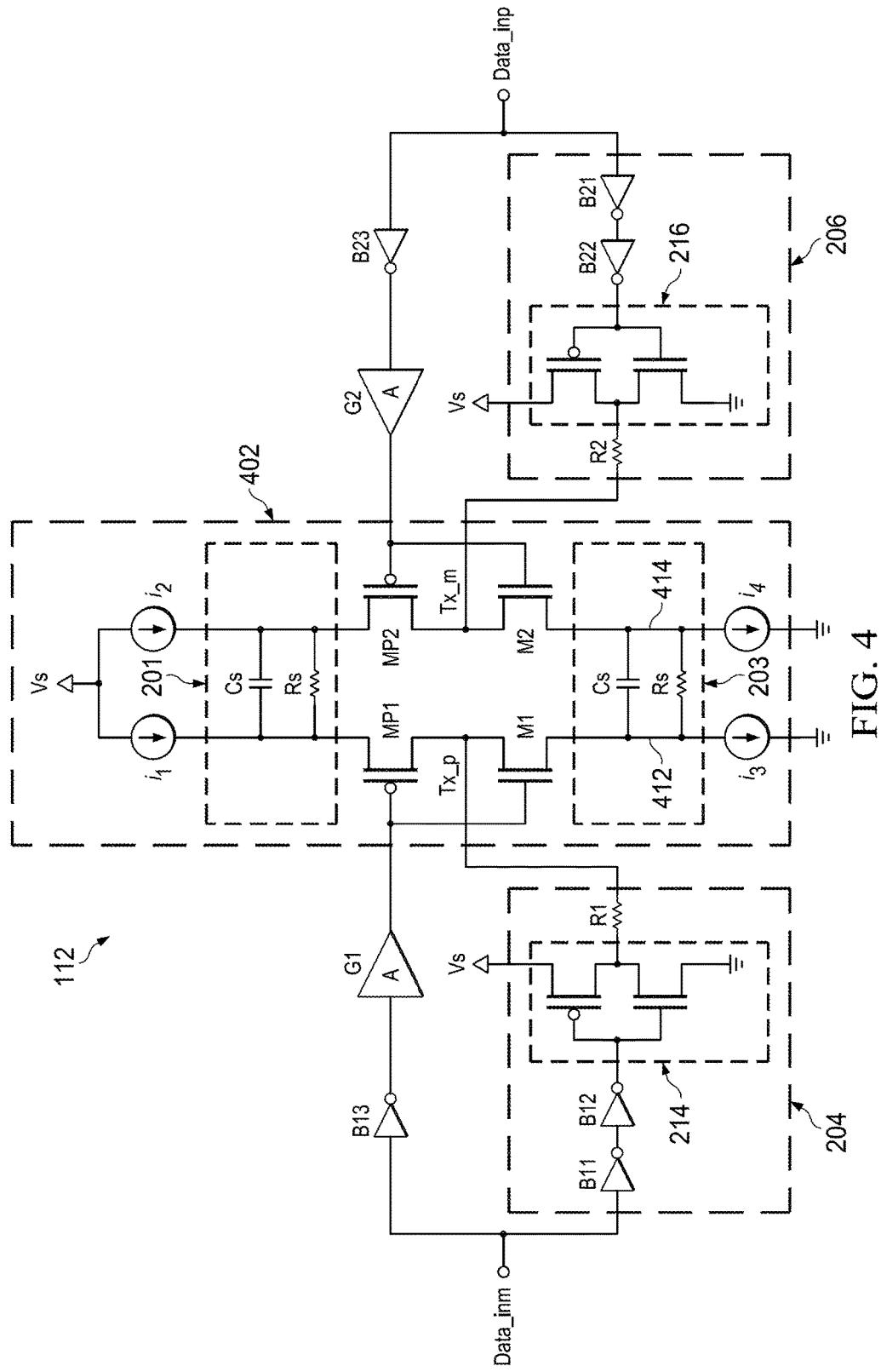
FIG. 4 illustrates a schematic diagram of a third implementation of the transmitter shown in FIG. 1 in accordance with various embodiments of the present disclosure.

FIG. 4 illustrates a schematic diagram of a third implementation of the transmitter shown in FIG. 1 in accordance with various embodiments of the present disclosure. The structure of the transmitter driver 112 shown in FIG. 4 is similar to that shown in FIG. 3 except that one additional RC degeneration network 203 has been added into the continuous time linear equalizer 402. As shown in FIG. 4, the RC degeneration network 203 comprises a resistor and a capacitor connected in parallel. A first terminal 412 of the RC degeneration network 203 is connected to a common node of the n-type transistor M1 and the current source $i_3$. A second terminal 414 of the RC degeneration network 203 is connected to a common node of the n-type transistor M2 and the current source $i_4$. The RC degeneration network 203 may form one additional zero frequency.

One advantageous feature of having the continuous time linear equalizer 402 shown in FIG. 4 is the additional zero frequency may further increase the gain boost of the continuous time linear equalizer 402. As a result, the continuous time linear equalizer 402 is capable of providing a wide signal swing range as well as a larger boost in gain at a high frequency. It should be noted such a high frequency can be determined through selecting an appropriate zero placement. For example, a boost in gain at a high frequency can be achieved by placing a zero at this high frequency.

FIG. 5 illustrates a timing diagram showing signals associated with the embodiment shown in FIG. 2. The horizontal axis of FIG. 5 represents intervals of time. The unit of the horizontal axis is nanosecond. The vertical axis represents the output voltage of the transmitter driver 112 shown in FIG. 2. As shown in FIG. 5, the output voltage is in a range from about −550 mV to about 550 mV.

Referring to FIG. 5, the solid line waveform represents the transient response of a transmitter driver including both a voltage mode driver (e.g., voltage mode drivers 204 and 206 in FIG. 2) and a current mode driver (e.g., transmitter driver 112 shown in FIG. 2). The dashed line waveform represents the transient response of a corresponding conventional voltage mode driver. As shown in FIG. 5, the continuous time linear equalizer of the transmitter driver 112 increases the gain of the transmitter. In an embodiment, the gain the transmitter is increased by about 3 dB by using the continuous time linear equalizer, compared to a conventional voltage mode driver operating under similar conditions. The amount of the gain increase may be adjustable by varying the currents flowing through the continuous time linear equalizer (e.g., currents sources $i_1$, $i_2$, $i_3$ and $i_4$). More particularly, the amount of the gain increase may be digitally controlled by adjusting the currents flowing through the continuous time linear equalizer.

Figure 8:
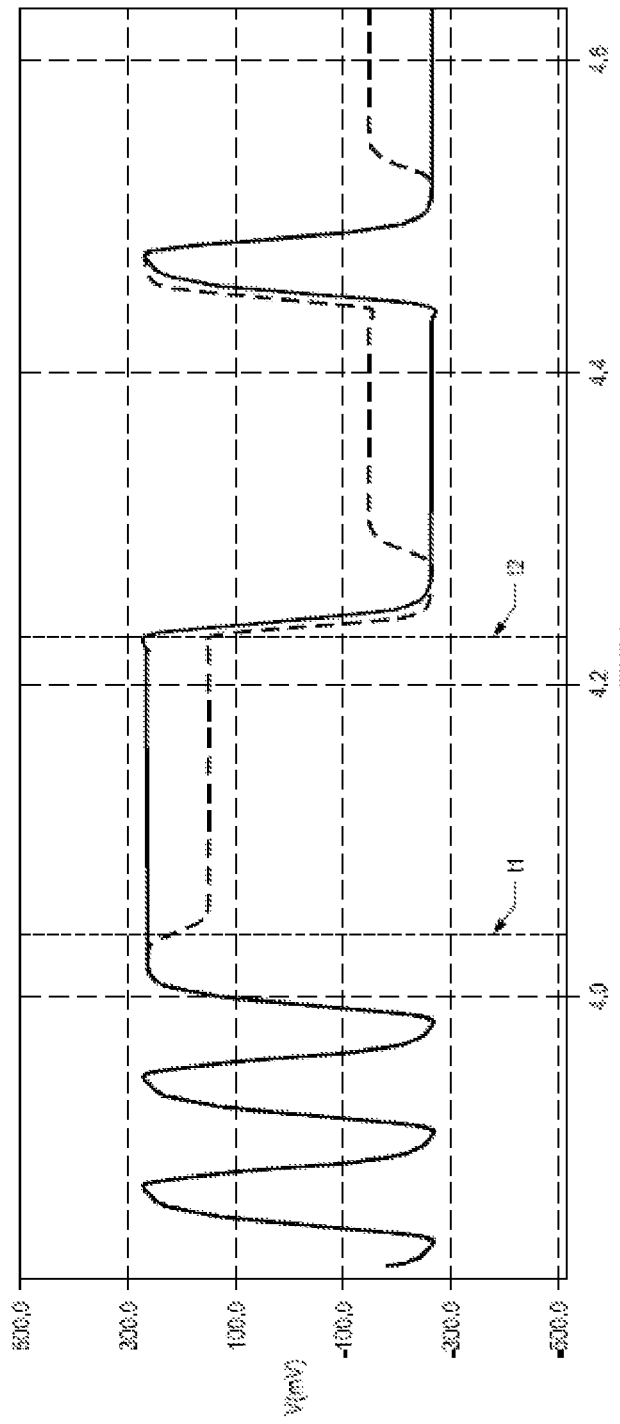
FIG. 8 illustrates a timing diagram showing signals associated with a conventional voltage mode driver having a finite-impulse response (FIR) based equalization mechanism.

FIG. 8 illustrates a timing diagram showing signals associated with a conventional voltage mode driver having a finite-impulse response (FIR) filter. The dashed line waveform represents the transient response of the conventional voltage mode driver having the FIR filter. The solid line waveform represents the transient response of the conventional voltage mode driver not having the FIR filter. As shown in FIG. 8, from time instant t1 to time instant t2, the amplitude of the conventional voltage mode driver having the FIR filter is lower than the amplitude of the conventional voltage mode driver not having the FIR filter. In other words, the FIR filter based equalization mechanism may cause a reduced amplitude of the output signal at a lower frequency.

Referring back to FIG. 5, the continuous time linear equalizer does not reduce the amplitude of the output signal of the transmitter driver 112 at a lower frequency.

It should be noted that the total power consumption of the transmitter driver 112 shown in FIG. 2 is approximately equal to that of a conventional voltage mode driver operating at a wide swing so as to achieve the same gain increase (e.g., 3 dB). In a conventional voltage mode driver, the signal swing range is limited by the supply voltage (e.g., Vs shown in FIG. 2) applied to the voltage mode driver. By employing the continuous time linear equalizer, the signal swing range may be improved by adjusting the supply currents (e.g., current sources $i_1$, $i_2$, $i_3$ and $i_4$), the RC degeneration network (e.g., RC degeneration network 201), the swing range of the voltage mode driver and any combinations thereof.

Figure 6:
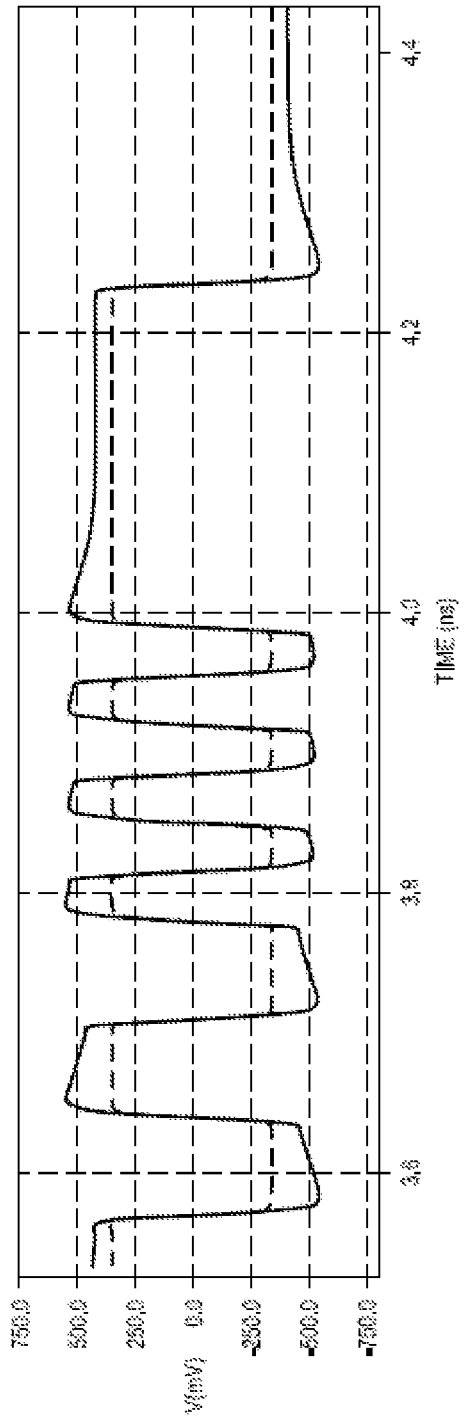
FIG. 6 illustrates a timing diagram showing signals associated with a transmitter having a supply voltage of 0.8 V.

FIG. 6 illustrates a timing diagram showing signals associated with a transmitter having a supply voltage of 0.8 V. The transmitter of FIG. 6 is of a structure similar to that shown in FIG. 2. The horizontal axis of FIG. 6 represents intervals of time. The unit of the horizontal axis is nanosecond. The vertical axis represents the output voltage of the transmitter driver shown in FIG. 1. As shown in FIG. 6, the output voltage is in a range from about −550 mV to about 550 mV.

As shown in FIG. 6, the output voltage includes two waveforms. The solid line waveform represents the transient response of a transmitter including both a voltage mode driver and a current mode driver. The dashed line waveform represents the transient response of a conventional voltage mode driver. As shown in FIG. 6, the continuous time linear equalizer may increase the gain of the transmitter driver 112.

In some embodiments, the high frequency gain boost of the transmitter driver 112 resulting from using the continuous time linear equalizer is about 2.6 dB. As shown in FIG. 6, the continuous time linear equalizer helps to extend the output signal swing range to about 1.1 V (from −0.55 V to 0.55 V) with a 0.8 V supply voltage.

Figure 7:
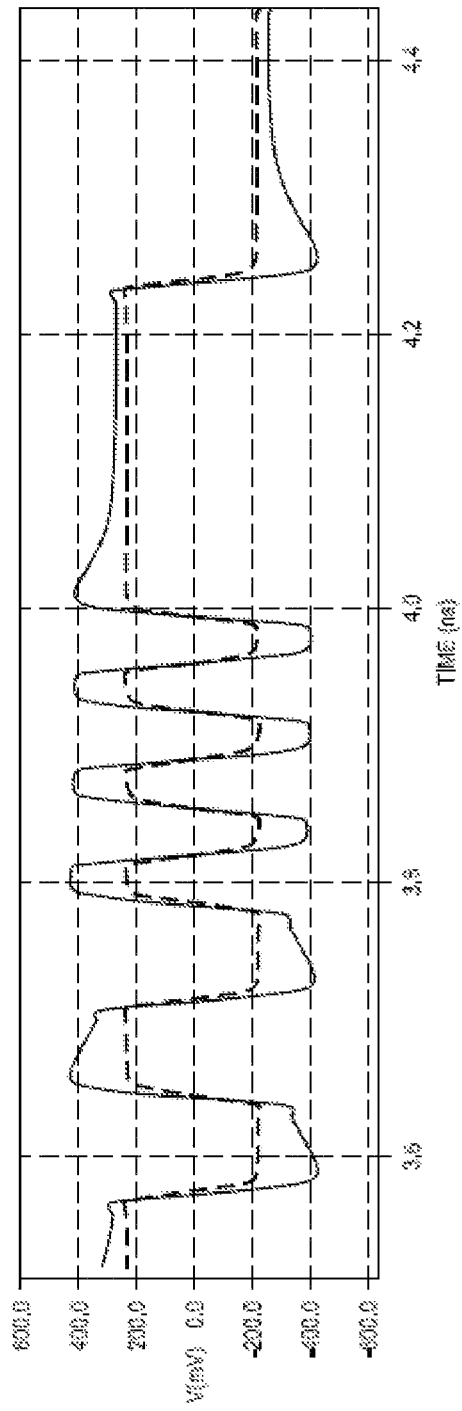
FIG. 7 illustrates a timing diagram showing signals associated with a transmitter having a supply voltage of 0.6 V.

FIG. 7 illustrates a timing diagram showing signals associated with a transmitter having a supply voltage of 0.6 V. The horizontal axis of FIG. 7 represents intervals of time. The unit of the horizontal axis is nanosecond. The vertical axis represents the output voltage of the transmitter shown in FIG. 1. As shown in FIG. 7, the output voltage is in a range from about −420 mV to about 420 mV.

As shown in FIG. 7, the output voltage includes two waveforms. The solid line waveform represents the transient response of a transmitter including both a voltage mode driver and a current mode driver. The dashed line waveform represents the transient response of a conventional voltage mode driver. As shown in FIG. 7, the continuous time linear equalizer may increase the gain of the transmitter. In some embodiments, the high frequency gain boost of the transmitter resulting from using the current mode logic stage is about 4.2 dB. As shown in FIG. 7, the continuous time linear equalizer helps to extend the output signal swing range to about 0.84 V (from −0.42 V to 0.42 V) with a 0.6 V supply voltage.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A transmitter driver comprising:
a first voltage mode driver having an input connected to a first data input port;
a second voltage mode driver having an input connected to a second data input port; and
a continuous time linear equalizer having a first input connected to the first data input port, a second input connected to the second data input port, a first output port connected to an output port of the first voltage mode driver and a second output port connected to an output port of the second voltage mode driver, wherein the continuous time linear equalizer comprises:
a first differential input stage;
a first Resistor Capacitor (RC) degeneration network coupled to the first differential input stage; and
a current source coupled to the first differential input stage.

2. The transmitter driver of claim 1, wherein:
the first voltage mode driver comprises a first transistor and a second transistor connected in series; and
the second voltage mode driver comprises a third transistor and a fourth transistor connected in series.

3. The transmitter driver of claim 1, wherein:
the first RC degeneration network comprises a resistor and a capacitor connected in parallel.

4. The transmitter driver of claim 1, wherein:
the first differential input stage comprises a first input transistor and a second input transistor, and wherein:
a gate of the first input transistor is configured to receive a first input signal from the first data input port; and
a gate of the second input transistor is configured to receive a second input signal from the second data input port.

5. The transmitter driver of claim 4, further comprising:
a second differential input stage comprising a third input transistor and a fourth input transistor, and wherein:
the third input transistor and the first input transistor are connected in series, wherein a common node of the third input transistor and the first input transistor is the first output port of the continuous time linear equalizer;
the fourth input transistor and the second input transistor are connected in series, wherein a common node of the fourth input transistor and the second input transistor is the second output port of the continuous time linear equalizer;
a gate of the third input transistor is connected to the gate of the first input transistor; and
a gate of the fourth input transistor is connected to the gate of the second input transistor.

6. The transmitter driver of claim 5, further comprising:
a first current source coupled between a bias voltage and the first input transistor; and
a second current source coupled between the bias voltage and the second input transistor.

7. The transmitter driver of claim 6, wherein:
the first RC degeneration network has a first terminal connected to the first current source and a second terminal connected to the second current source.

8. The transmitter driver of claim 6, further comprising:
a second RC degeneration network having a first terminal coupled to the third input transistor and a second terminal coupled to the fourth input transistor.

9. The transmitter driver of claim 8, further comprising:
a third current source coupled between the third input transistor and a ground; and
a fourth current source coupled between the fourth input transistor and the ground.

10. The transmitter driver of claim 9, further comprising:
a first termination resistor coupled between the output port of the first voltage mode driver and the first output port of the continuous time linear equalizer; and
a second termination resistor coupled between the output port of the second voltage mode driver and the second output port of the continuous time linear equalizer.

11. An apparatus comprising:
a first voltage mode driver comprising a first p-type transistor and a first n-type transistor connected between a bias voltage and a ground, wherein an input of the first voltage mode driver is connected to a first data input port;
a second voltage mode driver comprising a second p-type transistor and a second n-type transistor connected between the bias voltage and the ground, wherein an input of the second voltage mode driver is connected to a second data input port; and a continuous time linear equalizer connected in parallel with a voltage mode transmitter formed by the first voltage mode driver and the second voltage mode driver and having inputs connected to the first data input port and the second data input port respectively, wherein the continuous time linear equalizer comprises:
 a first differential input stage comprising a third p-type transistor and a fourth p-type transistor;
 a first Resistor Capacitor (RC) degeneration network coupled to the first differential input stage; and
 a plurality of current sources coupled to the first differential input stage.

12. The apparatus of claim 11, wherein:
the first RC degeneration network comprises a first resistor and a first capacitor connected in parallel.

13. The apparatus of claim 11, further comprising:
a second differential input stage comprising a third n-type transistor and a fourth n-type transistor; and
a second RC degeneration network coupled to the second differential input stage, wherein:
 the second differential input stage has a first input connected to a first input of the first differential input stage and a second input connected to a second input of the first differential input stage; and
 the second RC degeneration network comprises a second resistor and a second capacitor connected in parallel.

14. The apparatus of claim 13, wherein:
the third n-type transistor and the third p-type transistor are connected in series, wherein a common node of the third n-type transistor and the third p-type transistor is a first output port of the continuous time linear equalizer; and
the fourth n-type transistor and the fourth p-type transistor are connected in series, wherein a common node of the fourth n-type transistor and the fourth p-type transistor is a second output port of the continuous time linear equalizer.

15. The apparatus of claim 13, wherein:
a gate of the third n-type transistor is connected to the gate of the third p-type transistor; and
a gate of the fourth n-type transistor is connected to the gate of the fourth p-type transistor.

16. A transmitter comprising:
a first voltage mode driver having an input connected to a first data input port;
a second voltage mode driver having an input connected to a second data input port; and
a continuous time linear equalizer having a first input connected to the first data input port, a second input connected to the second data input port, a first output port connected to an output port of the first voltage mode driver and a second output port connected to an output port of the second voltage mode driver, wherein:
 the first voltage mode driver and the second voltage mode driver form a voltage mode transmitter; and
 the continuous time linear equalizer and the voltage mode transmitter are connected in parallel.

17. The transmitter of claim 16, wherein the continuous time linear equalizer comprises:
a first differential input stage;
a first Resistor Capacitor (RC) degeneration network coupled to the first differential input stage, wherein the first RC degeneration network comprises a first resistor and a first capacitor connected in parallel; and
a first current source coupled to the first differential input stage.

18. The transmitter of claim 17, further comprising:
a first zero frequency of the transmitter is adjusted through a first digital control mechanism applied to the first resistor and the first capacitor.

19. The transmitter of claim 18, further comprising:
a second differential input stage; and
a second RC degeneration network coupled to the second differential input stage, wherein:
 the second differential input stage has a first input connected to a first input of the first differential input stage and a second input connected to a second input of the first differential input stage; and
 the second RC degeneration network comprises a second resistor and a second capacitor connected in parallel.

20. The transmitter of claim 19, wherein:
a second zero frequency of the transmitter is adjusted through a second digital control mechanism applied to the second resistor and the second capacitor.

* * * * *